United States Patent [19]

Wakai

[11] Patent Number: 4,467,419
[45] Date of Patent: Aug. 21, 1984

[54] DATA PROCESSING SYSTEM WITH ACCESS TO A BUFFER STORE DURING DATA BLOCK TRANSFERS

[75] Inventor: Katsuro Wakai, Hadano, Japan

[73] Assignee: Hitachi, Ltd., Tokyo, Japan

[21] Appl. No.: 331,895

[22] Filed: Dec. 17, 1981

[30] Foreign Application Priority Data

Dec. 23, 1980 [JP] Japan .................................. 55-182543

[51] Int. Cl.³ .............................................. G06F 13/06
[52] U.S. Cl. .................................................. 364/200
[58] Field of Search ............................... 364/200, 900

[56] References Cited

U.S. PATENT DOCUMENTS 3,588,829  6/1971  Boland ................................. 364/200
3,611,307  10/1971  Podvin ............................... 364/200
3,771,137  11/1973  Barner et al. ....................... 364/200
4,323,968  4/1982  Capozzi ............................... 364/200

Primary Examiner—Gareth D. Shaw
Attorney, Agent, or Firm—Antonelli, Terry & Wands

[57] ABSTRACT

A data processing system having a main storage, a buffer storage and a control unit for controlling read and write operations of the main storage and the buffer storage is disclosed. When a data requested by a basic processing unit is not in the buffer storage, a block of data is transferred from the main storage to the control unit in a plurality of times each together with a first access request in order to write the block of data from the main storage in the buffer storage. The basic processing unit issues a second access request to the control unit to read or write data from or in the buffer storage. The control unit accepts the second request between the sequential first access requests.

7 Claims, 8 Drawing Figures

DATA PROCESSING SYSTEM WITH ACCESS TO A BUFFER STORE DURING DATA BLOCK TRANSFERS

The present invention relates to a data processing system, and more particularly to a data processing system having a buffer storage.

Figure 1:
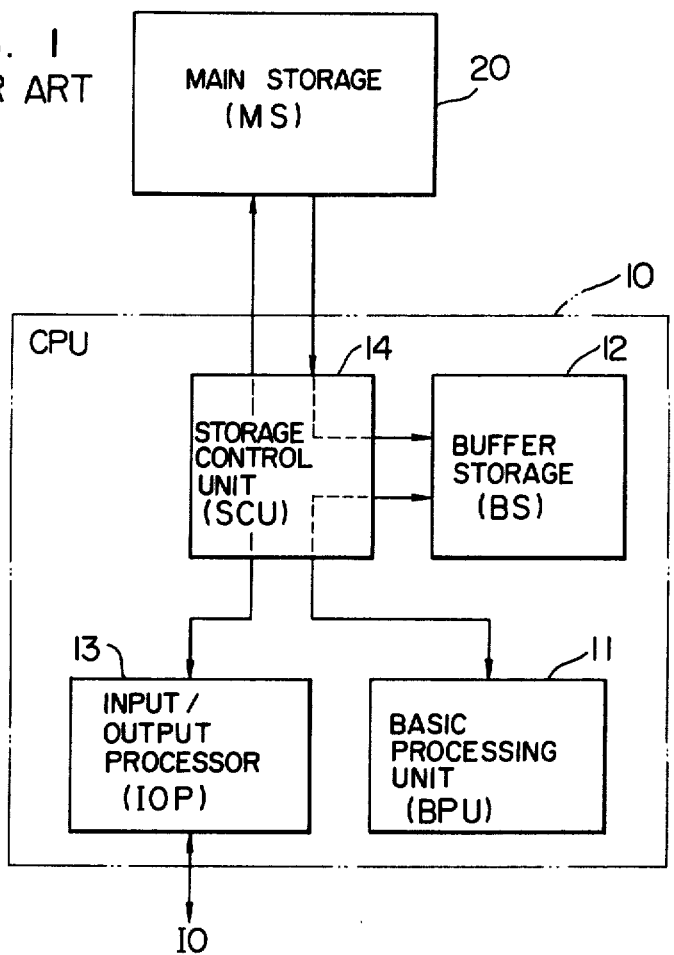

As shown in FIG. 1, a large scale data processing system comprises a main storage (MS) 20 for storing data (instructions and operands) and a central processing unit (CPU) 10 which includes a basic processing unit (BPU) 11 for executing the instructions, a buffer storage (BS) 12 for storing a partial copy of the MS 20, an input/output processor (IOP) 13 for controlling data transfer between an input/output unit (IO) and the MS 20 and a storage control unit (SCU) 14 for controlling read and write operations of the MS 20 and the BS 12.

A difference in the configuration of FIG. 1 from small and middle scale information processing systems resides in the fact that the buffer storage 12 is provided and the storage control unit 14 is an independent unit which executes and controls or buffers accesses to the MS 20 and the BS 12 when such accesses ae requested simultaneously so that the data transfer ability of the system is considerably increased.

The BS 12 is a small capacity, high speed memory unit. The content of the MS 20 is divided into a plurality of sequential multi-byte (e.g. 64 bytes) blocks. The BS 12 stores a copy of the content of the MS 20 in the unit of a block.

Since the instructions and the operands for the program to be executed in the BPU 11 are fetched and read from the BS 12 at a high speed, the execution time of the instructions is reduced. The result of the operation in the BPU 11 is again written in the BS 12 and also written in the MS 20. On the other hand, when data from the IOP 13 is to be stored, the data is written only to the MS 20, and if a block containing the data address has been registered in the BS 12, the registration in invalidated. Through those operations, the equality of the contents of the MS 20 and the BS 12 is assured.

When the address of the instruction or operand read request (access request) from the BPU 11 has not been registered in the BS 12, a data block containing that address is transferred from the MS 20 and serially written in the BS 12. This is called a block transfer.

In a large scale information processing system such as the one shown in FIG. 1, various attempts to enhance the processing performance have been made. In one attempt, the instructions are pipeline-controlled so that the execution of an instruction which spreads over a number of cycles is accomplished at a rate of one instruction per cycle.

Figure 2:
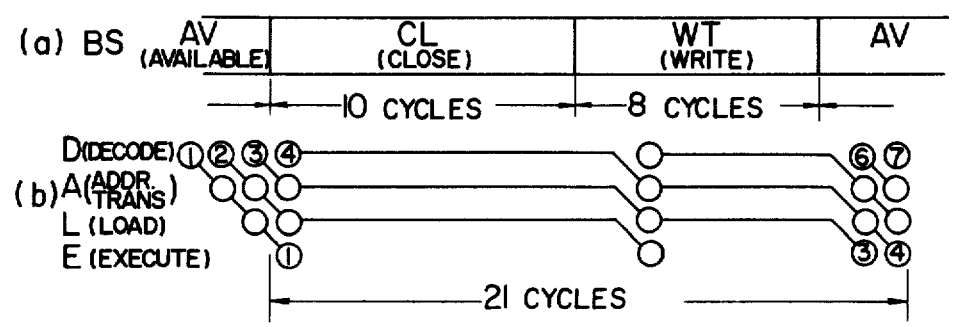

FIG. 2 shows a sequence chart for a conventional control system as a whole.

FIG. 2(a) shows the status of the BS 12 and FIG. 2(b) shows the pipeline control stages of the instruction. In FIG. 2(b), the execution status of the instruction is shown by machine cycles (abscissa) for pipeline stages (ordinate) D (decode), A (address translation), L (load) and E (execution), and the sequence of the instruction executed is shown by ⓘ(i=1, 2, 3, ...). The stage D is a decode stage which is carried out independently and in which an instruction is fetched from an instruction fetch control unit which supplies an instruction word and the fetched instruction is decoded. The stage A is an address translation stage in which a virtual address of an operand read request is translated to a real address and the registration of an area corresponding to the translated real address in the BS 12 is checked. The stage L is a data read stage in which an operand read request is issued to the BS 12 and the read operand is transferred to an arithmetic unit of the BPU 11. The stage E is an instruction execution stage in which the operand read by the arithmetic unit of the BPU 11 is processed, the result is checked and a store request of the result is issued to the BS 12 and the MS 20 or the result is loaded to a general purpose register or a floating point register.

In the most ideal case, each of the stages D through E can be completed in one cycle and the instructions can be sequentially executed. Accordingly, each instruction can be effectively executed in one cycle.

The symbol ⓘ indicates an initiation time of the execution in the respective pipeline control stages. The position of the symbol ⓘ, as it goes from left to right, shows the transition of the machine cycle time in the BPU 11 and the instruction execution status for the stages D through E.

FIG. 2(a) shows the status of the BS 12, that is, AV (available), CL (close) and WT (write).

In the status AV, the BS 12 can accept the access request from the BPU 11. In the status CL, the access request from the BPU 11 is not accepted during the block transfer from the MS 20 because the access request was issued from the BPU 11 to the BS 12 but the corresponding data was not in the BS and the block transfer request has been issued to the MS 20. In the status WT, the access request from the BPU 11 is not accepted because the block data tansferred from the MS 20 is being written to the BS 12.

In FIGS. 2(a) and 2(b), the stages D, A, L and E for the first instruction ① are completed in one cycle, respectively, but the block transfer occurs for the read request to the BS 12 by the second instruction ② because the requested operand has not been registered in the BS 12.

Assuming that a block size of the BS 12 is 64 bytes, and the read data width of the data from the MS 20 is 8 bytes, then 8-byte data is transferred eight times from the MS 20 to the BS 12 and the block-transferred data is written in the BS 12 eight bytes at a time. Accordingly, one cycle is needed for every eight bytes and the status WT takes eight cycles. It is assumed that the status CL takes ten cycles.

The instruction or operand is transferred from the SCU 14 to the BPU 11 sixteen bytes at a time. When the first data and the second data of the block transfer are received from the MS 20, a read termination signal is sent to the BPU 11 and the data is transferred.

Accordingly, the instruction ② shown in FIG. 2(b) waits for the termination of the operand read at the stage L, and at the third cycle from the beginning of the status WT, it can shift to the stage E. The instruction ③ which instructs the readout from the BS 12, however, is not completed in the status WT because the write status WT to the BS 12 due to the block transfer by the instruction ② continues for eight cycles and it has to wait for six cycles in the stage L. The operand readout is completed when the status of the BS 12 shifts from WT to AV and the instruction ③ can shift to the stage E.

In the prior art system, therefore, the time required from the initiation of the execution of the instruction ① to the termination of the execution of the instruction ④ is only four cycles if all of the requested operands are in the BS 12, but it is 21 cycles if the operand for the instruction ② is not in the BS 12. That is to say, the delay of the execution time due to the single block transfer is 17 cycles (21−4=17) which materially reduces the processing performance of the information processing system.

By increasing the capacity of the BS 12 to increase the probability of the presence of the requested data in the BS 12 in order to reduce the frequency of the block transfer, the processing performance may be increased. However, since the semiconductor devices used in the BS 12 must be of high performance, they are integrated in a low density, consume large power, are very expensive and must operate at a high speed. Accordingly, it is practically difficult to increase the capacity of the BS 12.

It is an object of the present invention to provide a data processing system which allows an access to a buffer storage from a basic processing unit (BPU) even during a block transfer.

The present invention provides a data processing system having a main storage (MS) and a buffer storage (BS) and a control unit which controls the read and write operations of the MS and the BS. The MS is divided into blocks each containing a plurality of data bytes and the BS stores a number of data. The BS stores a copy of one of the blocks of the MS. When a block transfer is requested to the MS, the MS transfers a block of data to the control unit in several units at successive times each together with a first access request in order to write the block of data into the BS. On the other hand, the BPU issues a second access request to the control unit to read or write the data from or into the BS. The control unit accepts the second access request between the sequential first access requests. Thus, since the access request from the BPU is accepted during the block transfer, the performance is improved.

Figure 3:
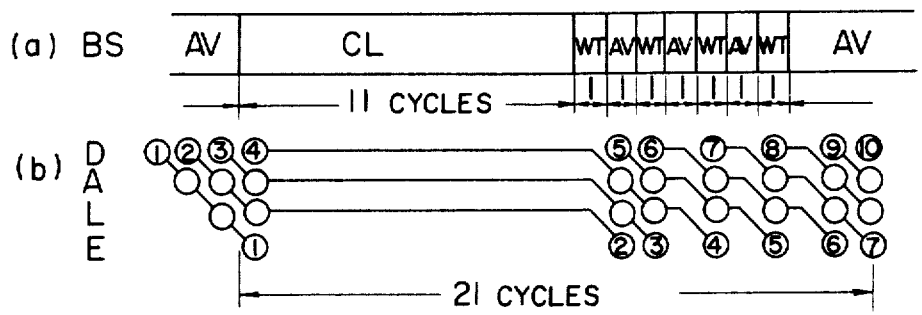
Figure 5A:
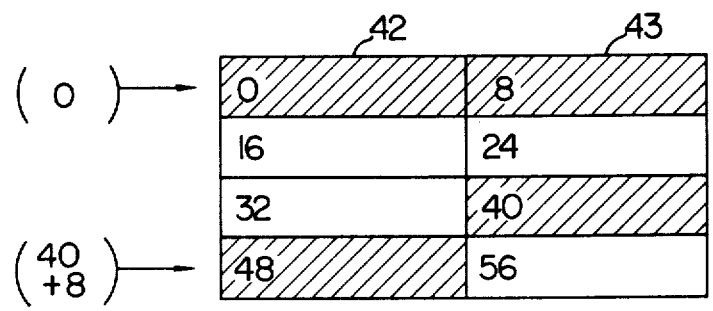
Figure 5B:
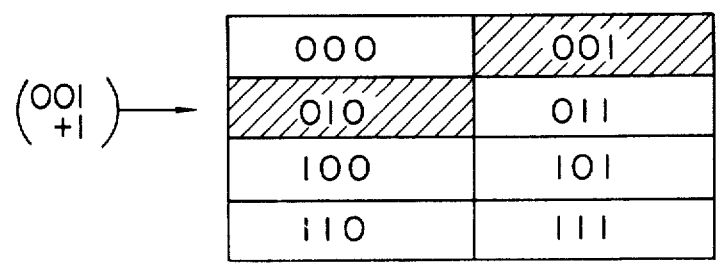
Figure 4:
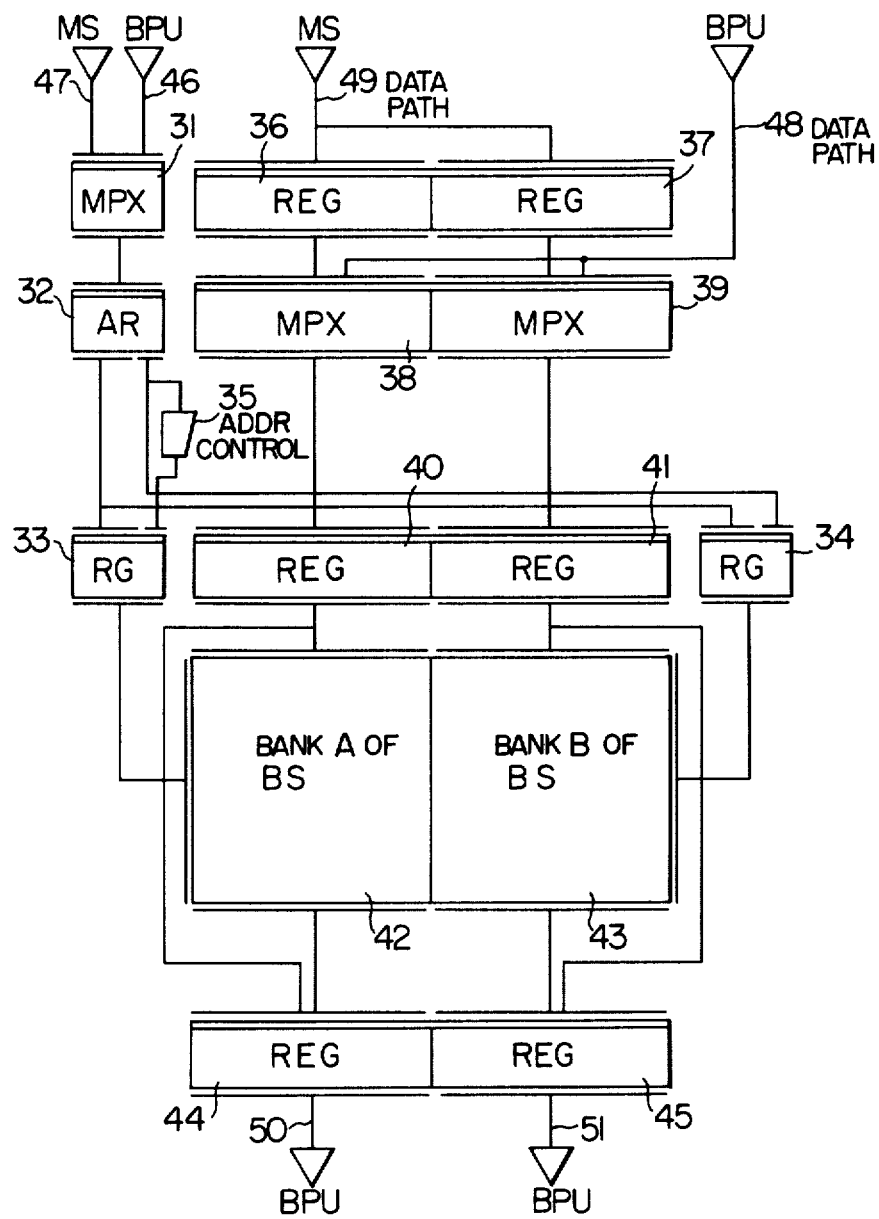
Figure 6:
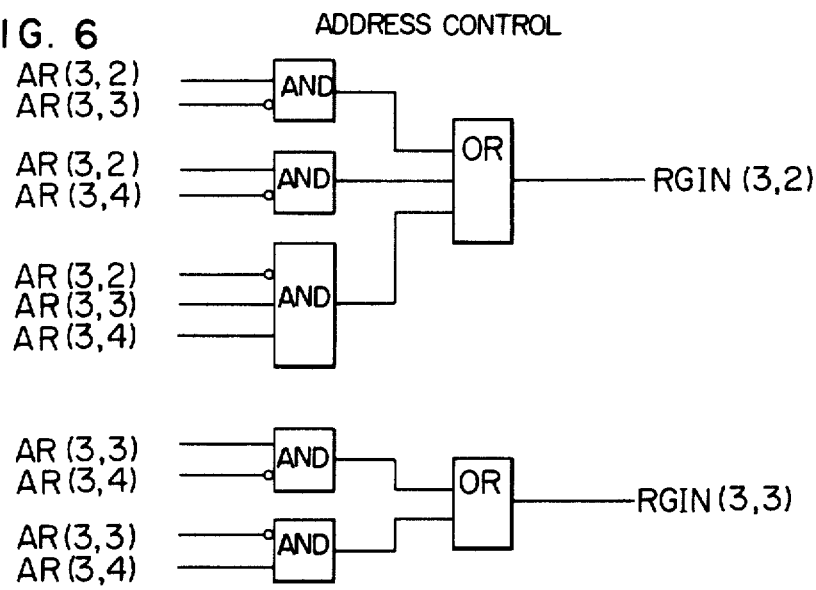
Figure 7:
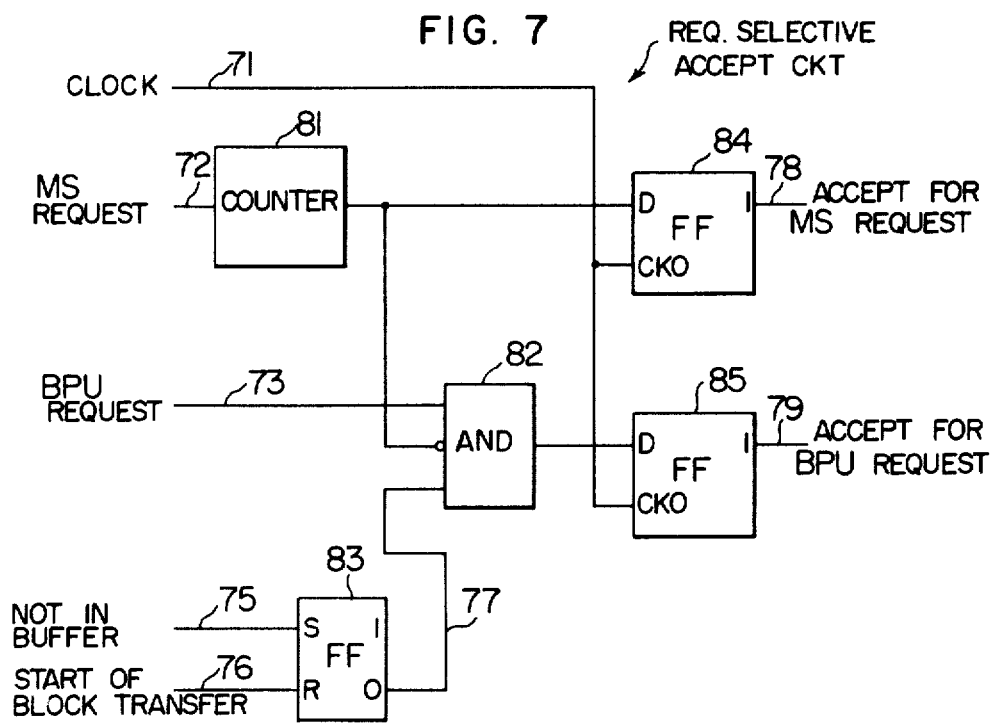

The preferred embodiments of the present invention will be described with reference to the accompanying drawings in which;

FIG. 1 shows a block diagram of a conventional data processing system,

FIG. 2 shows a sequence chart for explaining the operation of the conventional data processing system, FIG. 3 shows a sequence chart for explaining a principle of the present invention, FIG. 4 shows a block diagram of one embodiment of the present invention, FIGS. 5a and 5b illustrate sequences of transferred data to a BS shown in FIG. 4, FIG. 6 shows a detail of an address control circuit shown in FIG. 4, and FIG. 7 shows an access request selective accept circuit.

FIG. 3 illustrates a principle of the present invention, and shows the status of the BS and the execution status of the instruction for each pipeline control stage when the same instruction as that of FIG. 2 is executed.

In the present system, in order to avoid a reduction of the instruction execution ability due to competition or collision between the block transfer request and the BPU access request, the configuration of the data transfer path from the MS 20 to the BS 12 is the block transfer is modified and the priority of the BPU access request and the block transfer request is controlled.

In accordance with the present invention, the unit of data capable of being written into the BS 12 from the MS 20 is a plural number of times as large as that of the conventional system, that is, a plural number of times (for example, two times) as large as the data transfer width so that the block transferred data is written sixteen bytes at a time. As shown in the status WT in FIG. 3(a), the status AV which allows the acceptance of the BPU access request is established only for one cycle between the write cycle and the following write cycle. Consequently, following to the execution of the instruction ② which instructs the initiation of the block transfer, the operand for the instruction ③ and the operands for the instruction ④ and ⑤ can be read so that the overall processing performance is improved.

In the conventional system shown in FIG. 2, four instructions are executed during 21 cycles starting from the initiation of the block transfer request while in the present system seven instructions are executed during the 21 cycles. Accordingly, the overhead of the block tranfer is 17 cycles in the conventional system while it is 14 cycles in the present system.

A probability of non-registration of the access request from the BPU 11 in the BS 12 is usually no less than 10% per instruction in the large program system although it depends on a particular program. Thus, an effective overhead of the block transfer is equal to a product of the overhead of the block transfer (14 cycles) times the probability (10%), that is, 1.4 cycles per instruction. In the conventional system, the effective overhead is equal to a product of 17 cycles times 10%, that is, 1.7 cycles. Accordingly, the present invention can increase the processing speed by 0.3 cycle per instruction. Since one instruction is executed in four cycles on the average, the processing performance is improved by approximately 8% in the present invention.

FIG. 4 shows a block diagram of BS's and peripheral circuits in one embodiment of the present invention.

A bank A of a BS 42 and a bank B of a BS 43 can read and write eight-byte (doubleword) data and can be independently accessed by addresses loaded in a register 33 and a register 34, respectively. A doubleword of data to be stored in the bank A 42 is loaded in a register 40, and a doubleword of data to be stored in the bank B 43 is loaded in a register 41. The doublewords of data read from the bank A 42 and the bank B 43 are loaded to registers 44 and 45, respectively. The addressing to the bank A 42 and the bank B 43 is done alternately in units of eight bytes. That is, addresses 0–7 are allotted to the bank A 42, the following addresses 8–15 are allotted to the bank B 43, the addresses 16–23 are allotted to the bank A 42, the addresses 24–31 are allotted to the bank B 43 and so on. For example, when the address in the register 33 is one of 0–7, the eight bytes at the corresponding address 0–7 are parallelly read from the bank A 42 and loaded into the register 44.

When the BPU issues an access request, the address is supplied to a multiplexor (MPX) 31 through a path 46 and the store data is supplied to a multiplexor (MPX) 38 or 39 through a path 48.

On the other hand, when the MS issues a block transfer request, the address is supplied to the multiplexor (MPX) 31 through a path 47 and the block data is supplied to registers (REG) 36 and 37 through a path 49.

The block transfer request from the MS and the access request from the BPU are selectively accepted and the address supplied through the path 46 or 47 is selected by the multiplexor 31 and supplied to an address register (AR) 32. The acceptance of the access request will be explained later in connection with FIG. 7. The content of the address register 32 is supplied to the two registers 33 and 34 with portions of the address bits being supplied to the register 33 through an address control circuit 35. The address control circuit 35 will be explained later in conjunction with FIG. 6. The address bits supplied to register 33 are not modified by the address central circuit 35 when a $2^3$-bit of the address in the register 32 is "0" (that is, when the doubleword address excluding the three low order bits of the address is even), but eight is added to the address by the address control circuit 35 when the $2^3$ bit is "1" (that is, when the doubleword address excluding the three low order bits of the address is odd), as will be described in more detail hereinafter.

When the write data is sent from the BPU, eight bytes at a time, through the path 48, either one of the multiplexors 38 or 39 is selected and the content thereof is loaded into the register 40 or 41 and thence written into the BS 42 or 43. When the write address is an even doubleword address, the multiplexor 38 and the register 40 are selected and the data is written at the address specified by the address register 33, and when the write address is an odd doubleword address, the multiplexor 31 and the register 41 are selected and the data is written at the address specified by the address register 34.

The block transfer data is sent from the MS through the path 49 in eight cycles, 8 bytes in each cycle. The block transfer from the MS to the BS is accomplished first to the address requested by the block transfer request and then to incremental interblock addresses. The interblock addresses can be represented by six bits ($2^6=64$) when the block size is 64 bytes. Since the data is written in the banks 42 and 43 of the BS's eight bytes at a time, the three high order bits of the interblock address can identify the eight bytes in the block. The three-bit address is sequentially incremented from "000" to "111" to effect the block transfer. When the address reaches "111", it is wrapped around to "000".

When the block transfer is to start from an even doubleword address, the even bank 42 and the odd bank 43 of the BS are paired, and when the block transfer is to start from an odd doubleword address, the odd bank and the even bank 42 are paired.

FIGS. 5a and 5b illustrate the write sequence of the block transferred data to the BS shown in FIG. 4. FIG. 5a illustrates in decimal notation, while FIG. 5b illustrates in binary rotation.

In the BS shown in FIGS. 5a and 5b, the data at the interblock high order address "000" is stored at the addresses 0-7 in the odd bank 42, the data at the interblock high order address "001" is stored at the address 8-15 in the odd bank 43, the data at the interblock high order address "010" is stored at the addresses 16-23 in the even bank 42 and so on.

If the block transfer starts from the even doubleword address, for example "000", the addresses 0-7 of the even bank 42 and the addresses 8-15 of the odd bank 43 are paired so that sixteen bytes are parallelly written in the BS (as shown by hatched areas). If the block transfer starts from the odd doubleword address, for example "101", the addresses 40-47 of the odd bank 43 and the addresses 48-55 of the even bank 42 are paired so that sixteen bytes are parallelly written in the BS (as shown by hatched areas).

When the block transfer starts from the odd doubleword address, the write address for the even bank 42 of the BS is larger than that of the odd bank 43 by eight (or one as viewed from the interblock high order address).

Referring to FIG. 5b which shows the interblock high order address in binary notation, when the 64-byte data write starts from the bank "001", the banks "001" and "010", the banks "011" and "100", the banks "101" and "110" and the banks "111" and "000" are paired respectively and the data is written in four cycles.

The address control circuit 35 controls the addressing. When the block transfer address from the MS or the read address from the BPU is loaded into the address register 32 shown in FIG. 4, the address control circuit 35 checks the fourth bit ($2^3$ bit) in the interblock address counted from the least significant bit to determine if it is "1" or "0", and if it is "0", the interblock address is loaded into the register 33, and if it is "1", the interblock address is incremented by eight and the incremented address is loaded into the register 33. In this manner, it is determined whether the first interblock high order address is even or odd, and if it is even, the address to be loaded into the register 33 need not be modified because the even bank 42 and the odd bank 43 are paired, and if it is odd, the address incremented by eight by the address control circuit 35 is loaded into the register 33 because the even bank 42 which is one row lower than the odd bank 43 is used to write the data.

FIG. 6 shows a logic circuit for the address modification in the address control circuit 35 of FIG. 4.

The address control circuit 35 modifies two high order bits of the interblock high order address. Referring to FIG. 6, AR (3, 2) indicates a second bit of a third byte of the address, AND denotes an AND gate and OR denotes an OR gate.

Three bits AR (3, 2), AR (3, 3) and AR (3, 4) which are the interblock high order address of the output from the address register 32 shown in FIG. 4 are supplied to the logic circuit of FIG. 6, which produces output data RGIN (3, 2) and RGIN (3, 3) to the register 33 for the memory bank of the BS.

The relation between AR (3, 2), AR (3, 3), AR (3, 4) and RGIN (3, 2), RGIN (3, 3) is shown below.

| AR (3, 2) | AR (3, 3) | AR (3, 4) | RGIN (3, 2) | RGIN (3, 3) |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 1 | 0 |
| 1 | 0 | 1 | 1 | 1 |
| 1 | 1 | 0 | 1 | 1 |
| 1 | 1 | 1 | 0 | 0 |

Other bits are not modified. As seen from the above table, when the bit AR (3, 4) or the $2^3$ bit is "0", AR (3, 2) and AR (3, 3) appear as RGIN (3, 2) and RGIN (3, 3) without modification, and when it is "1", they are incremented by eight.

Referring again to FIG. 4, the transfer of the data address and the write of data in the BS during the block transfer and the data transfer to the BPU are explained.

For example, when the interblock high order address is "001" and the data requested by the access request from the BPU has not been registered in the BS, a block transfer from the MS starts. As the access to the MS has been accepted and the data is sequentially transferred from the MS to the BS, the first data at the interblock high order address "001" is first loaded into the register 37 through the path 49. The address circuit and the BS are not affected at this time.

In the second cycle, the second data at the next interblock high order address "010" is sent through the path 49 and loaded into the register 36. The address is simultaneously supplied through the path 47.

The SCU preferentially handles the block transfer request so that the path 47 is selected by the multiplexor 31 and the address is loaded into the register 32.

Then, the contents of the registers 37 and 36 are loaded into the registers 41 and 40, respectively, through the multiplexors 39 and 38, and are also loaded into the registers 45 and 44, respectively. The registers 41 and 40 retain the data to be written in the banks 43 and 42 of the BS, respectively, and the registers 45 and 44 retain the read data to be transferred to the BPU.

On the other hand, the address in the register 32 is loaded directly into the register 34, while the address increased by eight by the address control circuit 35 is loaded into the register 33. When the addresses are supplied to the banks 43 and 42 of the BS and a write pulse is simultaneously applied thereto, the 8-byte (doubleword) data in the register 41 is written in the bank 43 and the 8-byte data in the register 40 is written in the bank 42. The contents of the registers 45 and 44 are fed to the BPU as the instruction or the operand.

In the third cycle, the data at the interblock high order address "011" is supplied to the register 37 through the path 49. The address circuit, the BS and the registers 44 and 45 are used to handle the access request from the BPU. The multiplexor 31 selects the path 46 and the multiplexors 38 and 39 select the path 48.

In the fourth cycle, the data at the interblock high order address "100" is transferred to the register 36. The data is then written in the banks 43 and 42 in the same manner as above. In this cycle, the access request from the BPU to the BS is inhibited.

In the fifth cycle, the data at the interblock high order address "101" is transferred from the MS 20. The multiplexors 31, 38 and 39 select the paths 46 and 48 to accept the access request from the BPU.

In the sixth cycle, the block transfer of the data at the interblock high order address "110" is accepted and the data at the interblock high order addresses "101" and "110" are written in the BS.

As seen from the above, the registers 36 and 37 buffer data of two block transfers.

In this manner, the block transfer and the BPU access request are alternately handled.

FIG. 7 shows an example of an access request selective accept circuit.

A logic circuit shown in FIG. 7 is used to selectively accept the block transfer request from the MS and the access request from the BPU.

The block transfer request from the MS is supplied to a counter 81 through a path 72. When the counter 81 counts two access requests, it produces a "1" output which is fed to a data input terminal D of a flip-flop 84. This signal is sampled when a clock supplied through a path 71 is "1" to produce a "1" output on a path 78. Accordingly, for every two access requests transferred from the MS, one access request is accepted. The signal on the path 78 selects the multiplexors 31, 38 and 39 to the MS.

A flip-flop 83 indicates the status CL shown in FIG. 3. It is set by a signal on a path 75 which is present when the data requested by the BPU is not in the BS and the block transfer is requested to the MS, and reset by the initiation of the block transfer. The reset output of the flip-flop 83 is supplied to an AND gate 82 through a path 77.

The access request from the BPU is supplied to the AND gate 82 through a path 73. When the output signal of the counter 81 is "0" and the flip-flop 77 is reset, the AND gate 82 is opened to set a flip-flop 85 to produce a "1" output on a path 79 so that the access request from the BPU is accepted. The signal on the path 79 selects the multiplexors 31, 38 and 39 to the BPU.

In the illustrated embodiment, the eight-byte registers 36 and 37 are used to buffer sixteen-byte data transferred in two cycles from the MS, and write the sixteen-byte data in the BS in one access cycle. Alternatively, 8n-byte data transferred in n cycles may be buffered and the 8n-byte data may be written in the BS in one access cycle.

While the block transfer is effected serially eight bytes at a time and the write to the BS is effected sixteen bytes at a time in the illustrated embodiment, the present invention is not limited to the specific embodiment and the byte width may be variable.

What is claimed is:

1. A data processing system in which access by a processor to a buffer storage is permitted during a data block transfer from a main storage to the buffer storage, comprising:

a main storage for storing data sectioned into blocks each including a plurality of data bytes;

a buffer storage for storing a copy of one of the blocks of said main storage as a unit; and control means for controlling read and write operations of said main storage and said buffer storage in response to a received access request;

said main storage including means for transferring a block of data to said control means in sub-units of said unit during a plurality of successive transfer times, each sub-unit of data being transferred together with a first access request to write the data in said buffer storage during a respective one of said successive transfer times;

processor means for issuing a second access request to said control means to read or write data from or into said buffer storage;

said control means including accepting means for accepting receipt of said second access request from said processor means between first access requests sequentially received from said main storage so as to permit a buffer storage access by said processor means during a data block transfer from said main storage.

2. A data processing system according to claim 1 wherein said control means includes register means for buffering data which is smaller than one block transferred in n transfer times, where n is an integer equal to or greater than 2, from said main storage, and said accepting means includes means for accepting as an access request to said buffer storage every n first access requests transferred to said control means from said main storage.

3. A data processing system according to claim 2 wherein said control means includes means for writing the data transferred to said register means in n cycles into said buffer storage in one access cycle.

4. A data processing system according to claim 3 wherein said accepting means accepts said second access request before the n first access requests have been transferred from said main storage to said control means.

5. A data processing system according to claim 4 wherein said accepting means includes means for inhibiting the acceptance of said second access request when n first access requests have been accepted as one access request to said buffer storage.

6. A data processing system according to claim 1 wherein said control means includes means for buffering data transferred from said main storage in n transfer cycles, where n is an integer which is equal to or greater than 2 but smaller than said plurality of successive transfer times, and means for writing the buffered data into said buffer storage when n first access requests are transferred to said control means, while said accepting means accepts the second access request in $(n-1)$ cycles.

7. A data processing system according to claim 1 wherein said control means includes means for controlling the block transfer such that a block of data is cyclically and intermittently written in said buffer storage in accordance with the first access requests to allow the second access request to be accepted in non-write status of said buffer storage during the block transfer.

* * * * *